United States Patent Office 2,928,870
Patented Mar. 15, 1960

2,928,870
SULFUR TRIFLUORIDES OF ORGANIC ETHERS

William Robert Hasek, Wilmington, Del., assignor to E. I. du Pont de Nemours and Company, Wilmington, Del., a corporation of Delaware No Drawing. Application August 19, 1958
Serial No. 755,863

6 Claims. (Cl. 260—543)

This invention relates to new organic compositions containing fluorine and to a process for preparing these compositions.

Compounds containing fluorine in chemical combination possess unusual chemical and physical properties and have achieved considerable technical importance in recent years. The preparation and properties of compounds which contain fluorine-carbon bonds have been studied extensively but relatively little attention has been given to organic compounds which contain fluorine bonded to an element other than carbon. In particular, organic compounds which contain fluorine bonded to sulfur have received little study, possibly because no economical and satisfactory method has been known for their preparation. Organic compounds which contain tetravalent sulfur in which three fluorine atoms are bonded to sulfur have been especially difficult to obtain in good yields by practical methods.

Organic compounds containing sulfur bonded to fluorine have generally been prepared by processes which employ elemental fluorine or liquid hydrogen fluoride. Special precautions must be observed in operating these processes in view of the known corrosive and toxic properties of the reactants. The processes yield principally perfluorinated products, that is, compounds which are free of hydrogen and which are perfluorocarbonsulfur pentafluorides. Yields of organic sulfur trifluorides are generally quite low and, when obtained, contain primarily perfluorocarbon groups as the organic radicals. A need exists for a flexible and economical process for preparing in good yield organic sulfur trifluorides containing organic groups other than perfluorocarbon radicals.

The novel compounds of the invention are produced by reacting sulfur tetrafluoride under substantially anhydrous conditions with an organic ether having as one substituent on the ether oxygen a trifluorovinyl group and as the other substituent on the ether oxygen an aliphatically saturated hydrocarbon or halohydrocarbon group in which any carbon bonded to halogen is otherwise bonded only to hydrogen or carbon. This sulfur tetrafluoride ($SF_4$) is reacted under substantially anhydrous conditions with an ether of the formula $ROCF=CF_2$. R represents an aliphatically saturated hydrocarbon or halogenated hydrocarbon group in which the halogens are preferably of atomic number 9 to 35, inclusive and in which the halogen-bearing carbons are otherwise bonded only to hydrogen or carbon. The R group is free of olefinic or acetylenic unsaturation and the carbon bonded to the ether oxygen is halogen-free, that is, except for the oxygen bond, it is bonded only to hydrogen or carbon.

The exact mechanism of the reaction is not known but the overall reaction may be represented by the following equation:

$$R-O-CF=CF_2 + SF_4 \rightarrow R-O-CF_2-CF_2-SF_3$$

It is obvious from the above equation that the characteristic feature of the reaction is the addition of sulfur tetrafluoride to the double bond of the trifluorovinyl group. The nature of the R group, within the limits previously defined for this group, is therefore not critical in the operation of the process. It can have an open chain or cyclic structure and can be an alkyl, cycloalkyl, halogenated cycloalkyl, aryl and halogenated aryl group. The number of carbon atoms in the R group is not critical although solely for ease of handling it is preferred that the group have at most 18 carbons.

Typical classes of trifluorovinyl ethers which are operable in the process with specific examples in parentheses are alkyl trifluorovinyl ethers (octyl trifluorovinyl ether), cycloalkyl trifluorovinyl ethers (cyclohexyl trifluorovinyl ether), aryl trifluorovinyl ethers (phenyl trifluorovinyl ether), haloalkyl trifluorovinyl ethers (2,2,2-trifluoroethyl trifluorovinyl ether), halocycloalkyl trifluorovinyl ethers (4-chlorocyclohexyl trifluorovinyl ether), and haloaryl trifluorovinyl ethers (p-bromophenyl trifluorovinyl ether). The organic sulfur trifluorides obtained in the process from the above-named trifluorovinyl ethers are, respectively, β-octyloxytetrafluoroethylsulfur trifluoride, β-cyclohexyloxytetrafluoroethylsulfur trifluoride, β-phenoxytetrafluoroethylsulfur trifluoride, β-(2,2,2-trifluoroethoxy)tetrafluoroethylsulfur trifluoride, β-(4-chlorocyclohexyloxy)tetrafluoroethylsulfur trifluoride, and β-(p-bromophenoxy)tetrafluoroethylsulfur trifluoride.

The trifluorovinyl ethers can be prepared by methods described in the literature (see, for example, Lovelace, Rausch and Postelnek, "Aliphatic Fluorine Compounds," Chap. V, American Chemical Society Monograph Series No. 38, published in 1958 by Reinhold Publishing Corp.). Methods for obtaining sulfur tetrafluoride are also described in technical publications (see Brown and Robinson, J. Chem. Soc. 1955, 3147–51).

The reaction of the trifluorovinyl ether and sulfur tetrafluoride is conducted under substantially anhydrous conditions in either a batch or continuous flow process. In either process the reaction chamber is preferably made of material which is resistant to attack by hydrogen fluoride, for example, stainless steel.

In a batch process a vessel capable of withstanding pressure is preferably flushed with an inert gas, for example, nitrogen, to displace the air and charged with the trifluorovinyl ether. The vessel is preferably cooled to a low temperature, for example, by immersion in a solid carbon dioxide-acetone mixture. The reaction vessel is then evacuated to a low pressure, about 10 mm. or less, and charged with sulfur tetrafluoride. The vessel is closed and the mixture heated at the desired temperature with suitable mechanical agitation.

It is not essential for operability that the reactants be used in any particular ratios. However, in order to obtain maximum yield of the organic sulfur trifluorides, certain ratios of reactants are preferred. Generally the molar ratio of trifluorovinyl ether to sulfur tetrafluoride will be between about 1:5 and 5:1. Best yields are obtained if the molar ratio of trifluorovinyl ether to sulfur tetrafluoride lies between about 2:1 and 1:2. An excess of sulfur tetrafluoride can frequently be employed to advantage to assure complete conversion of the trifluorovinyl ether to the organic sulfur trifluoride.

The reaction can, if desired, be conducted in the presence of an inert solvent, that is, a solvent that does not react with ful tetrafluoride or the trifluorovinyl ether. Perfluorinated hydrocarbons are examples of suitable solvents. It is not essential, however, that a solvent be used.

The temperature of the reaction is kept as low as operability permits. It will generally lie between about 40° C. and about 350° C. although lower or higher temperatures can be employed. For example, measurable reaction of the components will take place at a temperature as low as 0° C. At higher temperatures, for example, 600° C., organic sulfur trifluorides are formed although side reactions may also ocur. The preferred temperature range lies between about 75° C. and about 300° C. An especially preferred range is between about 100° C. and about 250° C. In general, low molecular weight trifluorovinyl ethers, that is, ethers in which the organic substituent, R, is a short hydrocarbon or halohydrocarbon chain, react at lower temperatures than high molecular weight trifluorovinyl ethers. Excesively high temperatures are not necessary and provide little or no advantage in economy of operation or yield of desired product.

Heating of the reactants can be accomplished by a stepwise procedure wherein the reactants are maintained for short periods of time at progressively higher temperatures. This procedure permits smooth operation of the process and avoids sudden increases in pressure in the reaction vessel. However, this procedure is not essential for operability. The reactants can, if desired, be heated in one step to the reaction temperature. The time of heating for a batch process is generally between about 2 hours and about 48 hours.

The pressure employed in a batch process is generally autogenous. It can be between about 5 atmospheres and 200 atmospheres although lower or higher pressures can be employed without affecting operability. Pressure is not a critical factor in the process of the invention.

The process of the invention can also be conducted by a continuous flow method, wherein, for example, vapors of a trifluorovinyl ether and sulfur tetrafluoride gas are passed continuously through a heated tube. Alternatively, a high-boiling trifluorovinyl ether can be placed in a corrosion-resistant vessel and sulfur tetrafluoride gas passed through the ether at a predetermined temperature. Volatile reaction products can be collected in traps cooled with a suitable refrigerant. A continuous process is customarily operated at atmospheric pressure although it can be conducted at pressures that are higher or lower than atmospheric.

The products of the reaction, that is, the organo-substituted tetrafluoroethylsulfur trifluorides, are purified by conventional procedures, for example, distillation under reduced pressure through an efficient fractionating column.

The following examples in which quantities are expressed as parts by weight, illustrate the process of the invention. In each of the examples a vessel is used which is lined with "Hastelloy" C and is capable of withstanding pressure. "Hastelloy" C is a well-known chemically resistant alloy of nickel, iron and molybdenum.

*Example I*

A pressure vessel (capacity, 145 parts of water) which is lined with a corrosion-resistant alloy is flushed with nitrogen gas and charged with 11.2 parts of trifluorovinyl methyl ether. The charged vessel is cooled in a solid carbon dioxide-acetone mixture, evacuated to about 1-2 mm. pressure and charged with 19 parts of sulfur tetrafluoride. The sealed and charged vessel is heated with agitation (mechanical shaking) at 100° C. for 2 hours and 120° C. for 6 hours. After cooling to room temperature (about 25° C.), the volatile products in the tube are vented to a trap cooled with a solid carbon dioxide-acetone mixture. There remains in the reaction vessel 13.0 parts of liquid product which is removed and distilled under reduced pressure through an efficient fractionating column. There is obtained 8.9 parts of β-methoxytetrafluoroethylsulfur trifluoride, a colorless liquid which boils at 59–62° C./165 mm. The structure of the product is confirmed by the nuclear magnetic resonance spectrum and by elementary analysis. The yield of the substituted sulfur trifluoride is 41%.

*Analysis.*—Calc'd for $C_3H_3F_7OS$: C, 16.4; H, 1.4; F, 60.4; S, 14.6. Found: C, 17.1; H, 1.6; F, 59.8; S, 14.1.

*Example II*

Using the procedure described in Example I, a mixture of 14 parts of trifluorovinyl propyl ether and 18 parts of sulfur tetrafluoride is heated at 100° C. for 2 hours and 120° C. for 6 hours. There is obtained 21.9 parts of liquid reaction product which is distilled under reduced pressure through an efficient fractionating column to yield 15.9 parts of β-propoxytetrafluoroethylsulfur trifluoride, a colorless liquid which boils at 59–61° C./48 mm. The structure of the product is confirmed by the nuclear magnetic resonance spectrum and by elementary analysis. The yield of the substituted sulfur trifluoride is 63%.

*Analysis.*—Calc'd for $C_5H_7F_5OS$: C, 24.2; H, 2.8; F, 53.6; S, 12.9. Found: C, 24.8; H, 3.0; F, 51.7; S, 12.9.

The process as illustrated in the above examples is generically applicable to the preparation of organic sulfur trifluorides of the structure $ROCF_2CF_2SF_3$ in which R has the meaning given in previous paragraphs. It can be used to prepare β-hexyloxytetrafluoroethylsulfur trifluoride,
β-dodecyloxytetrafluoroethylsulfur trifluoride,
β-octadecyloxytetrafluoroethylsulfur trifluoride,
β-cyclohexyloxytetrafluoroethylsulfur trifluoride,
β-(p-octylphenoxy)tetrafluoroethylsulfur trifluoride,
β-(2,2,2-trichloroethoxy)tetrafluoroethylsulfur trifluoride,
β-(1,1,7 - trihydroperfluoroheptyloxy)tetrafluoroethylsulfur trifluoride,
β-(2,4-dichlorophenoxy)tetrafluoroethylsulfur trifluoride,
β-(pentachlorophenoxy)tetrafluoroethylsulfur trifluoride, and
β - (1,1 - dihydroperfluorooctyloxy)tetrafluoroethylsulfur trifluoride from the appropriate trifluorovinyl ethers of the formula $ROCF=CF_2$.

A major advantage of the process of the invention is the preparation of a new class of organic sulfur trifluorides which cannot readily be obtained by previously known processes. This class of organic sulfur trifluorides is defined as organic ethers in which the oxygen is bonded, on the one hand, to a carbon of a 1,1,2,2-tetrafluoroethylsulfur trifluoride group and, on the other hand, to an aliphatically saturated hydrocarbon or halohydrocarbon group, in which any halogen-bearing carbon is otherwise bonded only to carbon or hydrogen.

The new compounds are further characterized by the structure $ROCF_2CF_2SF_3$ where R is an aliphatically saturated hydrocarbon or halohydrocarbon group and in which the carbon bonded to the ether oxygen is otherwise bonded only to hydrogen and carbon. The preferred halogens, if present on the R group, are fluorine, chlorine or bromine, that is, halogens of atomic number 9–35, inclusive.

The new compounds of the invention are generally colorless liquids or low-melting solids whose physical characteristics are determined by the number of carbons in the R group. From the point of view of purification and ease of handling it is preferred that the R group contains at most 18 carbon atoms. However, compounds in which the R group contains a higher number of carbon atoms, for example, 24 or more, can be obtained. To illustrate, the compound $C_{24}H_{49}OCF_2CF_2SF_3$ can be obtained by the process of the invention.

The new class of surfur trifluorides react readily with water and are preferably stored under conditions which prevent the ready access of atmospheric moisture. They are highly reactive compounds which are generically useful as fluorinating agents, for example, they can be employed to introduce fluorine into compounds which contain carbonyl groups. Thus, β-methoxytetrafluoroethylsulfur trifluoride will react with acetone to produce 2,2-difluoropropane or with carbon dioxide to produce carbon tetrafluoride. The new class of organic sulfur trifluorides are generically useful as treating agents to impart water-repellent properties to articles fabricated from cellulose. To illustrate a section of paper composed of substantially pure cellulose is immersed in a 10% solution of β-methoxytetrafluoroethylsulfur trifluoride in diethyl ether for a short period of time. The section is removed and dried in air. Drops of water placed on the treated paper are not absorbed for a minute or more and can be readily brushed off. Drops of water placed on the untreated paper are absorbed immediately and form wet spots.

I claim:

1. A process for the preparation of compounds of the formula R—O—CF$_2$—CF$_2$—SF$_3$ wherein R represents a member of the group consisting of hydrocarbon and halohydrocarbon groups free of aliphatic unsaturation and in which the carbon bonded to the ether oxygen is otherwise bonded only to a member of the group consisting of hydrogen and carbon which comprises reacting sulfur tetrafluoride under substantially anhydrous conditions and under an inert atmosphere with an organic ether having as one substituent on the ether oxygen a trifluorovinyl group and as the other substituent on the ether oxygen a member of the group consisting of hydrocarbon and halohydrocarbon groups free of aliphatic unsaturation and in which any carbon bonded to halogen is otherwise bonded only to a member of the group consisting of hydrogen and carbon.

2. A process comprising reacting trifluorovinyl methyl ether with sulfur tetrafluoride under substantially anhydrous conditions and under an inert atmosphere.

3. A process comprising reacting trifluorovinyl propyl ether with sulfur tetrafluoride under substantially anhydrous conditions and under an inert atmosphere.

4. Organic sulfur trifluorides of the structure $$ROCF_2CF_2SF_3$$

wherein R represents a member of the group consisting of hydrocarbon and halohydrocarbon groups free of aliphatic unsaturation and in which the carbon bonded to the ether oxygen is otherwise bonded only to a member of the group consisting of hydrogen and carbon.

5. β-Methoxytetrafluoroethylsulfur trifluoride.

6. β-Propoxytetrafluoroethylsulfur trifluoride.

No references cited.